United States Patent
Hori

(10) Patent No.: US 6,435,440 B1
(45) Date of Patent: Aug. 20, 2002

(54) PRETENSIONER

(75) Inventor: Seiji Hori, Aichi-ken (JP)

(73) Assignee: Kabushiki Kaisha Tokai-Rika-Denki-Seisakusho, Aichi-ken (JP)

( * ) Notice: Subject to any disclaimer, the term of this patent is extended or adjusted under 35 U.S.C. 154(b) by 34 days.

(21) Appl. No.: 09/583,982

(22) Filed: May 31, 2000

(30) Foreign Application Priority Data

Oct. 6, 1999 (JP) .......................................... 11-285441

(51) Int. Cl.$^7$ ............................................... B65H 75/48
(52) U.S. Cl. ........................ 242/374; 280/806; 297/478; 60/632
(58) Field of Search ......................... 292/374; 280/806; 297/478; 60/632

(56) References Cited

U.S. PATENT DOCUMENTS

| | | |
|---|---|---|
| 5,050,814 A | 9/1991 | Butenop et al. |
| 5,295,714 A * | 3/1994 | Fohl ........................... 280/806 |
| 5,641,131 A | 6/1997 | Schmid et al. |
| 5,944,350 A * | 8/1999 | Grabowski et al. ......... 280/806 |
| 6,244,531 B1 * | 6/2001 | Hori et al. .................. 242/374 |

FOREIGN PATENT DOCUMENTS

| | | |
|---|---|---|
| DE | 195 08 626 A1 | 9/1996 |
| EP | 1 029 736 A1 | 8/2000 |
| EP | 1 050 440 A1 | 8/2000 |
| GB | 2 292 304 | 2/1996 |

* cited by examiner

*Primary Examiner*—Donald P. Walsh
*Assistant Examiner*—Jonathan R Miller
(74) *Attorney, Agent, or Firm*—Nixon Peabody LLP; Thomas W. Cole

(57) ABSTRACT

In a pretensioner, an axial direction of a generator accommodating portion is inclined from a direction which is orthogonal to an axial direction of the cylinder main body toward the cylinder main body. As a result, another axial direction end portion of the generator accommodating portion is positioned closer to the cylinder main body side and the dimensions of the pretensioner along the orthogonal axial direction of the cylinder main body becomes small. In addition, at a bottom portion side of the cylinder main body, an open space is generated along the orthogonal direction of the cylinder main body and therefore the pretensioner becomes more compact. Moreover, since the generator accommodating portion and the cylinder main body are connected such that a center axis of the generator accommodating portion is skewed with respect to the center axis of the cylinder main body, a large area can be secured for the opening into the cylinder main body while a compact structure is maintained.

20 Claims, 2 Drawing Sheets

PRETENSIONER

BACKGROUND OF THE INVENTION

1. Field of the Invention

The present invention relates to a pretensioner which is a portion of a seat belt device which restrains a vehicle occupant by a webbing belt.

2. Description of the Related Art

On a webbing belt which is configured as an elongated strip which restrains a vehicle occupant, or the so-called seat belt device, a pretensioner is provided. When the vehicle rapidly decelerates or is in some other predetermined state, the pretensioner increases the restraining power by forcefully rotating the winding shaft which is anchored to a longitudinal end portion of the webbing belt, in the direction in which the webbing is taken up.

The general structure of the above mention pretensioner will be explained below.

The pretensioner is provided with a cylinder which is a cylindrical configuration having a bottom. A piston is accommodated in an inner portion of the cylinder. At an opening end side of the cylinder, a rack bar is integrally formed with an end portion of the piston. At the side of the rack bar, a pinion gear which engages with the rack bar is disposed. The pinion is mechanically connected to the winding shaft by means of a one way clutch. The piston moves in the direction of the opening end side of cylinder, and the rack bar by rotating the pinion, forcefully rotates the winding shaft in a take-up direction.

At a side portion of the main body portion of the cylinder where the piston is accommodated, the generator accommodating portion is integrally connected with the main body portion of the cylinder, and the main body portion and the generator accommodating portion, together form the cylinder. The generator accommodating portion is a cylindrical configuration having both ends open. One end corresponds with the inner portion of the cylinder main body portion at the vicinity of the bottom portion thereof. Meanwhile, a gas generator is fitted in from the other end portion. The gas generator is a cylindrical form whose outer diameter dimension is slightly smaller that the inner diameter dimension of the generator accommodating portion. In the inner portion thereof, a gas generating agent which by combustion instantaneously generates a predetermined amount of gas and an ignition device for igniting the gas generating agent is accommodated. When the gas generating agent is combusted, gas is instantaneously provided between the bottom portion of the cylinder (main body portion) and the piston and it is the gas pressure of this gas by which the piston is pressed.

The ignition device is connected to a separately provided acceleration sensor either directly, or indirectly through a computer or some other control device. When the acceleration sensor detects a rapid deceleration of the vehicle, the ignition device operates.

In the pretensioner of the prior art described above, the axial direction of the cylinder accommodating portion is orthogonal to the axial direction of the cylinder main body portion. Consequently, even if the inner diameter dimension of the main body portion of the cylinder is small, the overall size of the cylinder cannot be small because of the effect of the length in the axial direction of the generator accommodating portion. If as in this manner, the pretensioner is large overall, when the cylinder is mounted to the vehicle, it is possible that it will interfere with the structural components of the vehicle. Choice in terms of a position for installing the pretensioner becomes limited and in some cases installation itself becomes difficult.

Further, in the pretensioner of the prior art, when the generator accommodating portion accommodates the gas generator, a stopper whose outer diameter dimension is large with respect to (that is, larger than) that of the main body portion of the gas generator determines the position of the gas generator. Correspondingly, at the other end portion of the generator accommodating portion a large diameter portion which is large enough to allow the stopper to fit is formed. This large diameter portion has an inner diameter dimension larger than the inner diameter dimension at the portion where the main body of the gas generator is accommodated. The stopper is accommodated at this large diameter portion and by abutting the bottom portion of the large diameter portion (that is, the portion defined by the large diameter portion and the portion which accommodates the main body portion of the gas generator), determines the position of the gas generator.

In this case, it is necessary for the outer diameter dimension of the generator accommodating portion to be sufficiently larger than the outer diameter dimension of the stopper. This causes the generator accommodating portion to be large and the pretensioner to be bulky.

SUMMARY OF THE INVENTION

In view of the above, an object of the present invention is to obtain a compact pretensioner.

A first embodiment of the present invention, is a pretensioner for use with a winding shaft and a webbing belt having an end, with the end anchored to the winding shaft, the pretensioner being for applying rotational force during a predetermined condition to the winding shaft, in a take-up direction for winding the webbing belt, the pretensioner comprising:

(a) a cylinder main body having an interior with a piston movably disposed therein, wherein gas pressure in the cylinder main body causes the piston to move in a direction for supplying rotational force to the winding shaft in a take-up direction for winding the webbing belt;

(b) a generator accommodating portion disposed generally as a cylinder integrally extending from the cylinder main body, the cylinder main body having a bottom, with an opening located between the piston and the bottom of the cylinder main body, the opening being connected in fluid communication with the cylinder of the generator accommodating portion; and (c) a gas generator mountable to said generator accommodating portion for generating gas under a predetermined condition, and supplying gas pressure for causing piston movement.

In a pretensioner with the above structure, under a predetermined condition, gas is generated in the gas generator and when the gas is supplied to the interior of the cylinder main body, the gas pressure (inner pressure) of the cylinder main body increases, thereby pressing the piston and causing the piston to move toward one axial direction end side thereof. This movement of the piston causes the winding shaft to rotate in the take-up direction. Consequently the force with which a vehicle occupant is restrained by the webbing belt increases.

Further, when this pretensioner is compared with a structure in which the axial direction of the generator accommodating portion is set in the direction orthogonal to the axial direction of the cylinder main body, since the axial direction of the generator accommodating portion thereof is inclined at the axial side of the cylinder main body from the direction orthogonal to the axial direction (the axial orthogonal direction) of the cylinder main body, if the axial direction dimensions of the generator accommodating portions are the same in the two cases, the other axial end portion of the generator accommodating portion (that is, the end portion at the side opposite the cylinder main body) is positioned nearer to the cylinder main body side in the present invention. For this reason, the dimension of the pretensioner which is set in the direction orthogonal to the axial direction of the cylinder main body becomes smaller, thus allowing the pretensioner to be compact.

Also, in the pretensioner of the present invention, a space is generated at the bottom portion side of the cylinder main body along the axial orthogonal direction of the cylinder main body from which the generator accommodating portion is inclined. Therefore, the pretensioner is more compact in this respect as well. Thus, even if a structural component of the vehicle is positioned at this portion, there are no bad effects when the pretensioner is mounted to a vehicle. Therefore assembly is facilitated and choice in terms of the position for mounting the pretensioner is increased.

In a second aspect of the present invention, the generator accommodating portion includes an end, and when the gas generator is mounted to the generator accommodating portion, the gas generator includes a protruding portion having an external periphery with a stopper formed thereon, with the stopper abutting the end of the generator accommodating portion.

According to this aspect, the stopper which is provided to the gas generator abuts the other end portion of the generator accommodating portion and thereby restricts the displacement of the gas generator. Due to this structure, the outer diameter dimension of the stopper may be smaller than the outer diameter dimension of the gas generator, provided that the outer diameter dimension of the stopper is larger than the inner diameter dimension of the gas generator. In addition, since the stopper does not have to be accommodated inside the generator accommodating portion, the thickness of the generator accommodating portion can be reduced. As a result, in the pretensioner based on the present aspect, the generator accommodating portion is more compact and this causes the pretensioner to be light and compact.

In a third aspect of the present invention, the generator accommodating portion and cylinder main body each have a center axis, which are skewed relative to one another. In the pretensioner based on this aspect, the center axis of the generator accommodating portion when extended does not coincide with the center axis of the cylinder main body. Thus, since the opening radial direction of the portion connecting the cylinder main body and the generator accommodating portion is inclined with respect to the opening radial direction of the generator accommodating portion, the opening radius of the connecting portion is larger than the opening radius of the generator accommodating portion. This results in the opening area of the connecting portion being large. Accordingly, it is possible to ensure a sufficient opening area for the connecting portion without placing the external periphery of the generator accommodating portion lower toward the outer bottom portion of the cylinder main body. That is, the pretensioner is more compact.

In a fourth aspect of the present invention, the cylinder main body has an opening end side with a thickness less than a thickness of the bottom of the cylinder main body. Due to this structure, the cylinder main body becomes compact and light and this contributes to the pretensioner as a whole being compact and light.

When the gas pressure of the gas supplied to the cylinder main body is at a maximum, because the piston is in the start position, the high gas pressure is basically exerted only in the vicinity of the bottom portion of the cylinder main body. However, when the piston rises due to an increase in internal pressure, the space in the inner portion of the cylinder main body increases relative to the volume of gas generated, causing the internal pressure to decrease. As a result, the gas pressure exerted at the opening end side of cylinder main body is not as much as the gas pressure exerted at the bottom portion side where the initial phase of gas generation occurs. Therefore, making the cylinder main body thin does not affect mechanical strength.

To summarize, according to the present aspect, in the vicinity of the bottom portion of the cylinder where a large amount of gas pressure is exerted, thickness and mechanical strength is ensured. Meanwhile, at the opening end portion side where comparatively little gas pressure is exerted, the thickness is reduced. Thus the pretensioner is compact and at the same time the necessary mechanical strength is ensured.

In a fifth aspect of the present invention, the above-described pretensioner further comprises a rack (bar) and pinion meshed with one another, with the pinion coupled to the winding shaft and the rack extending from the piston, wherein the rack moves with the piston, thereby rotating the pinion and applying rotational force to the winding shaft in the take-up direction for winding the webbing belt In a pretensioner with the above-described structure, when the piston moves due to increased internal pressure of the cylinder main body, the rack bar which is provided at one axial direction end portion of the piston rotates the pinion which meshes with the rack bar. The rotation of the pinion at this stage is transmitted to the winding shaft and rotates the winding shaft in the direction in which the webbing is taken up.

DESCRIPTION OF THE PREFERRED EMBODIMENTS

Figure 1:
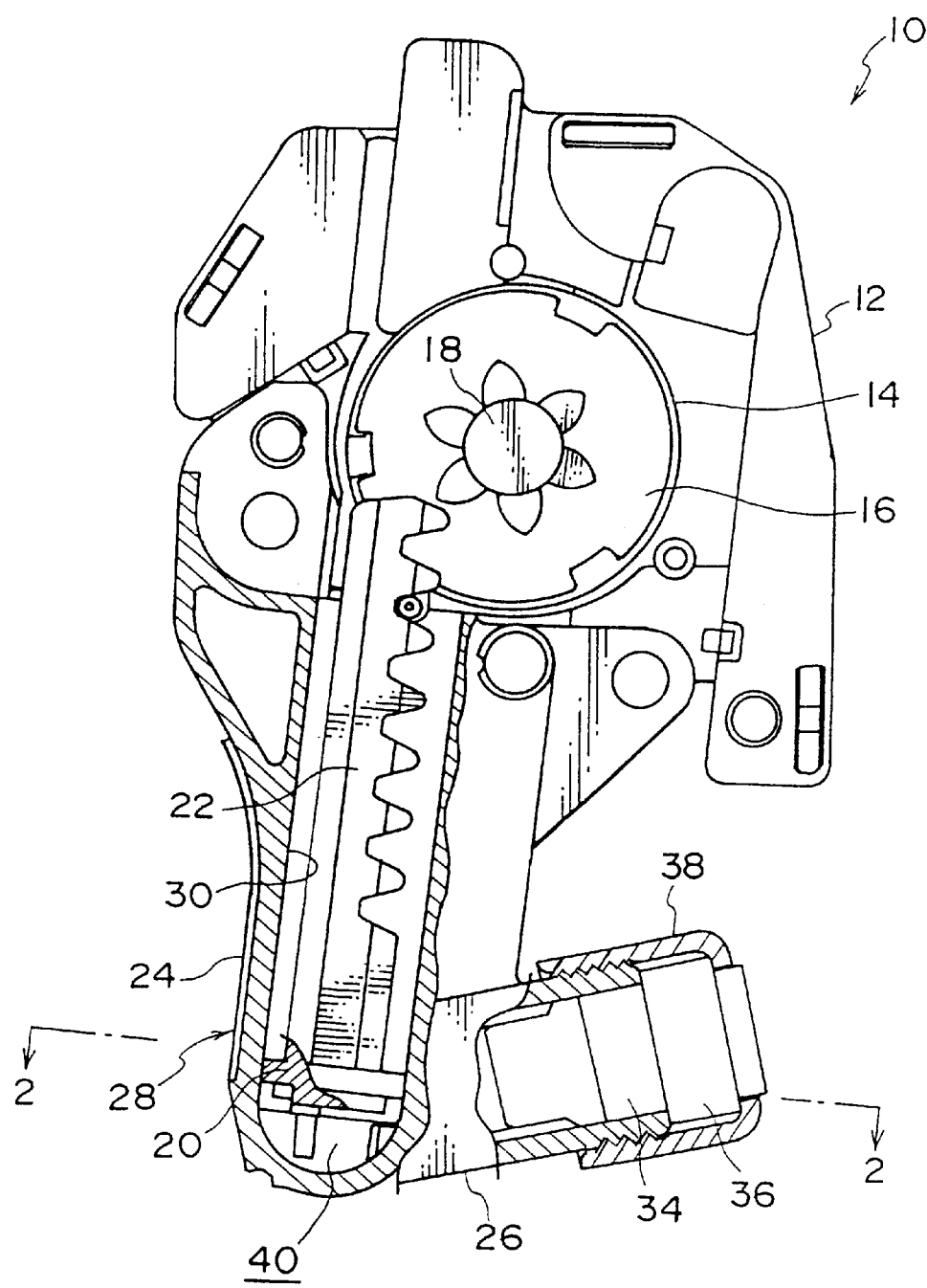
FIG. 1 is a vertical section of a pretensioner according to an embodiment of the present invention.

FIG. 1 is a cross sectional view of the structure of a pretensioner 10 according to an embodiment of the present invention. As illustrated in this figure, the pretensioner 10 includes a housing 12. The housing 12 is formed from metal or from hard synthetic resin material and is fixed to a leg plate (not illustrated) of the frame of the webbing retractor. An accommodating portion 14 is formed in the housing 12 and at the inner side thereof, a one way clutch 16 is disposed. The outer configuration of the one way clutch 16 is a disc-shape or is a cylinder whose axial direction dimension is comparatively short.

The one way clutch 16 does not transmit rotational force of one of its axial direction ends (a bottom portion side of the housing 12) to the other axial direction end. It, however, transmits rotational force of this other axial direction end to the one axial direction end.

The one axial direction end portion of the one way clutch 16 is mechanically connected to a winding shaft (not illustrated) which penetrates a cylindrical opening formed in the bottom portion of the accommodating portion 14 of the housing 12. The base end portion of the webbing belt (not illustrated) which is configured as an elongated strip is anchored to the external periphery of the winding shaft and by rotating in the take-up direction, the winding shaft takes up the webbing belt onto the outer peripheral portion thereof.

Further, a pinion 18 is fixed coaxially to the other axial direction end of the one way clutch 16.

At the side of the pinion 18, a rack bar 22 having the configuration of a square bar is disposed. A piston 20, which is configured as a disc, is integrally formed with one longitudinal end portion of the rack bar 22. On the rack bar 22, rack teeth which can mesh with the pinion 18 are formed in the cross direction-one end portion of the rack bar. By the sliding of the rack bar in the longitudinal direction towards the pinion 18, the rack teeth mesh with the pinion 18.

Moreover, as illustrated in FIG. 1, the pretensioner 10 includes a cylinder 28, which is formed with a cylinder main body 24 and a generator accommodating portion 26. The cylinder main body 24 is configured as a cylindrical form having a bottom. The inner side of the cylinder main body 24 is a piston accommodating portion 30. This piston accommodating portion 30 has an inner diameter dimension which is substantially equal to (strictly speaking, slightly larger than) the outer diameter dimension of the piston 20. In the piston accommodating portion 30, the piston 20 and a part or the whole of the cylinder 28 is accommodated. A space 40 which connects with the generator accommodating portion 26 is formed between the lower surface of the piston 20 and the bottom portion of the cylinder main body 24. As illustrated in FIG. 1, the thickness at the bottom portion side of the cylinder main body 24 is greater than the thickness at the opening end side.

The generator accommodating portion 26 is provided in a vicinity of the bottom portion of the cylinder main body 24. Specifically, the generator accommodating portion 26 is formed as a cylinder whose axial direction is slightly inclined towards the main cylinder main body side from the direction which is orthogonal with respect to the axial direction of the cylinder main body 24 (i.e., the radial direction of the piston accommodating portion 30). That is, as shown in FIG. 1, the axial direction of the generator accommodating portion 26 is not set in the direction orthogonal to the axis of the cylinder main body 24 (referred to as the axial orthogonal direction hereinafter). The axial direction of the generator accommodating portion 26 is inclined at a predetermined angle towards the axial direction of the cylinder main body 24 with respect to the axial orthogonal direction thereof.

In addition, one axial direction end portion of the generator accommodating portion 26 is integrally connected with the cylinder main body 24 at a vicinity of a bottom portion thereof, and through an opening portion 32 (See FIG. 2), the inner portion of the generator accommodating portion 26 and the inner portion of the cylinder main body 24 (that is, piston accommodating portion 30) are connected.

Figure 2:
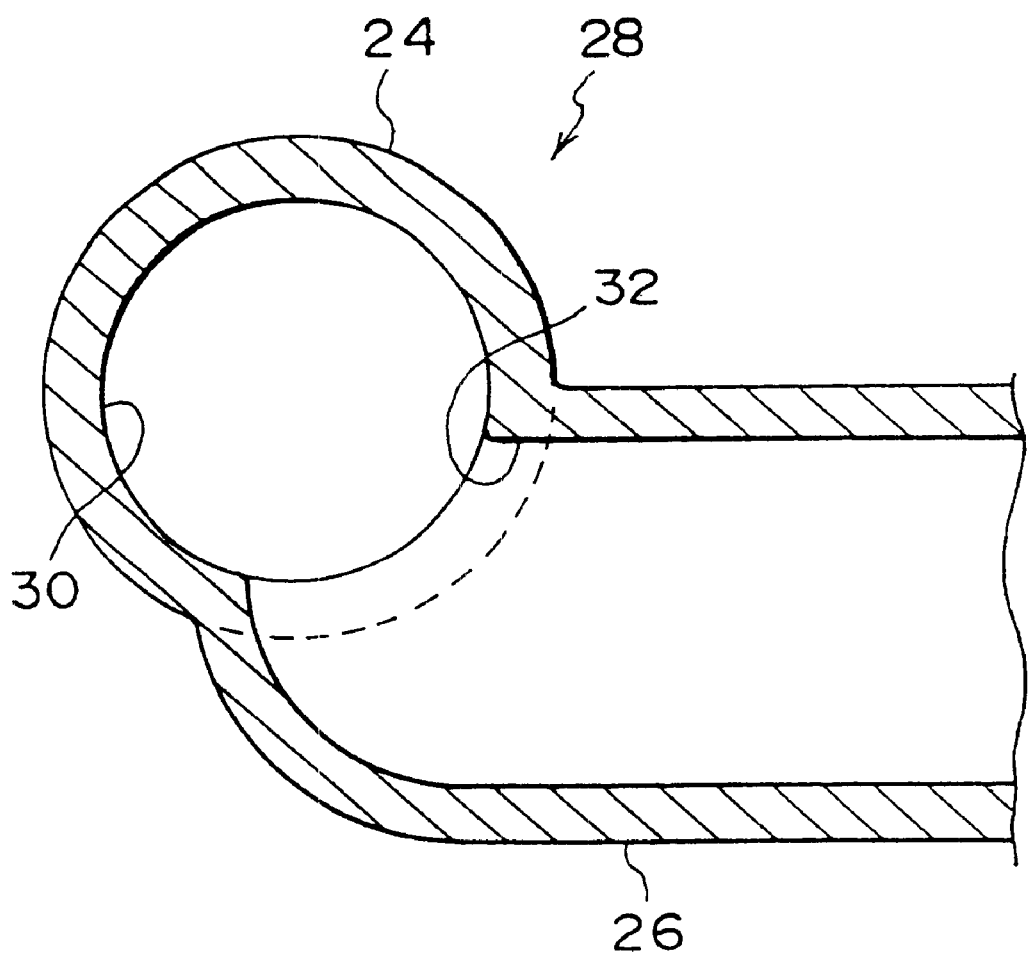
FIG. 2 is a section taken along 2—2 of FIG. 1.

As illustrated in FIG. 2 (the view from the upper surface), the center axis of the generator accommodating portion 26, is skewed with respect to the center axis of the cylinder main body 24. That is, the generator accommodating portion 26 is connected to the cylinder main body 24 such that the center axis of the generator accommodating portion 26 is offset with respect to that of the cylinder main body 24 and does not intersect the center axis of the cylinder main body 24.

As illustrated in FIG. 1, a generator 34 is accommodated in the inner portion of generator accommodating portion 26.

The gas generator 34 is a cylindrical form with an overall outer diameter dimension which is slightly smaller than the inner diameter dimension of the gas generator accommodating portion 26. In the inner portion of the gas generator 34, a gas generating agent and an apparatus for igniting the gas generating agent (neither illustrated) are accommodated. The gas generating agent, when burnt, instantaneously generates a predetermined amount of gas.

The ignition apparatus is connected to an acceleration sensor which is separately provided either directly, or indirectly by a computer or other control device (neither illustrated). When the acceleration sensor detects a rapid decrease in the speed of the vehicle, the ignition apparatus operates and the gas generating agent burns and instantaneously generates gas. The gas is supplied from one axial end portion of the gas generator 34 (the cylinder main body 24 end portion side) through the opening portion 32 to the interior of cylinder main body 24 i.e., into the space 40.

In addition, the other axial end of the gas generator 34, protrudes from the other axial direction end portion of the generator accommodating portion 26 and forms a stopper 36. That is, the stopper 36 is integrally formed with the protruding portion of the other axial direction end portion of the gas generator 34. The outer diameter dimension of the stopper 36 is smaller than the outer diameter dimension of the generator accommodating portion 26 but larger than the inner diameter dimension thereof. The stopper 36 abuts the other end portion of the generator accommodating portion 26 and thereby restricts the movement of the gas generator 34 in the interior of the gas generator accommodating portion 26.

Further, a cap 38 is attached to the other end portion of the generator accommodating portion 26. The cap is configured as a cylinder having a bottom. At the internal periphery of the opening end side of the thereof, a female screw is formed. Correspondingly, at the external periphery of the other end portion of the generator accommodating portion 26, a male screw is formed. By the male screw and the female screw being screwed together, the bottom portion of the cap 38 prevents the gas generator 34 from coming off.

The male screw of the generator accommodating portion 26 and the female screw of the cap 38 together form a left screw.

Further, an unillustrated cable or other connecting means extends from the gas generator 34. This connecting means is connected to the acceleration sensor of the vehicle either directly, or indirectly by a computer or other control means. When a signal is sent from the acceleration sensor or the control means by the connecting means to the ignition device inside the gas generator 34, the ignition device operates.

Next the operation and effects of the present embodiments will be described.

In the pretensioner 10, when the acceleration sensor detects a rapid deceleration of the vehicle, a signal is sent to the ignition device in the gas generator 34 either directly, or indirectly by a control means. The gas generating agent in the gas generator 34 burns and gas is generated instantaneously. The gas generated inside the gas generator 34 is supplied from the inner portion of the generator accommodating portion 26 through the opening portion 32 to the interior of the piston accommodating portion 30 (space 40) in the cylinder main body 24. When the gas is supplied into the space 40, the internal pressure of the open space 40 increases and this pressure increase causes the piston 20 to be pressed inside the piston accommodating portion 30 in the direction of the opening end side of the cylinder main body 24.

In this manner, due to the movement of piston 20, the rack bar 22 which is integrally formed with the piston 20, meshes with the pinion 18 and causes the pinion 18 to rotate. The rotation of the pinion 18 is applied to the winding shaft by the one way clutch 16 and the winding shaft is thereby rotated. Due to the rotation of the winding shaft, webbing belt is taken up onto the winding shaft and thus the force with which the body of the vehicle occupant is restrained is increased, causing the vehicle occupant to be more forcefully restrained than before.

As described above, in the cylinder main body 24 of the pretensioner 10, the thickness of the cylinder main body 24 at the opening end side is less than the thickness at the bottom portion side. When the cylinder main body 24 is viewed in terms of strength, the above-described bottom portion side of the cylinder main body 24 in which a great amount of gas pressure is exerted, requires adequate mechanical strength. However, the opening end of the cylinder main body 24, where gas pressure is exerted after the piston 20 moves and causes the internal pressure of the piston accommodating portion 30 to be lowered, does not require as much mechanical strength as the bottom portion. As in the present embodiment, because the thickness at the opening end is less than the thickness at the bottom portion, a light and compact cylinder 28 can be attained.

Because the axial direction of the generator accommodating portion 26 is inclined with respect to the axial orthogonal direction of the cylinder main body 24 towards the cylinder main body 24, the overall structure of the pretensioner 10 is compact That is, if for example, the directional dimensions of the generator accommodating portion 26 and the cylinder main body 24 are the same, when the generator accommodating portion 26 is inclined with respect to the axial orthogonal direction of the cylinder main body 24 towards the cylinder main body 24, the other end portion of the generator accommodating portion 26 (that is, the end portion at the side opposite of the cylinder main body 24) is closer to the cylinder main body 24 than when the generator accommodating portion 26 is provided such that the axial direction thereof is along the axial orthogonal direction of the cylinder main body portion 24. The result is the overall dimension of the pretensioner 10 viewed along the axial orthogonal direction cylinder main body 24 is smaller, causing the pretensioner 10 to be compact overall.

Further, as described above, because the axial direction of the generator accommodating portion 26 is inclined with respect to the orthogonal direction of the cylinder main body 24 toward the cylinder main body 24, a space can be created at the lower side of the generator accommodating portion 26 (this space would be occupied by the generator accommodating portion 26 if the axial direction thereof is set in the axial orthogonal direction of the cylinder main body 24). Therefore, even if there is a structural component of the vehicle body is in this space portion, it will not impede the assembly of the pretensioner 10. Thus, assembly is improved and with this improved assembly, the assembly process can be more efficient and assembly cost is thereby decreased.

Further, in the pretensioner 10, the center axis of the generator accommodating portion 26 is positioned such that it is skewed with respect to the center axis of the cylinder main body 24. The generator accommodating portion 26 is connected to the cylinder main body 24 such that the center axis of the generator accommodating portion 26 is offset with respect to that of the cylinder main body 24 and does not intersect the center axis of the cylinder main body 24. Thus, the radius of the opening portion 32 can be larger than inner diameter dimension of the generator accommodating portion 26.

In the case where the center axis of a generator accommodating portion passes through the center of the cylinder main body portion, the radius of an opening portion is, at maximum, equal to the radius of the generator accommodating portion. Also, since the gas generated in the gas cylinder must be supplied between the piston and the bottom portion of the cylinder main body in order for the piston to be pushed up by the gas pressure, the opening portion has to open at the bottom portion of the cylinder main body and not at the piston. In this situation, if the external periphery of the generator accommodating portion is placed in the same position as the outer side of the bottom portion of the cylinder main body, it is not possible to secure sufficient opening area for the opening portion. In order to secure sufficient opening area for the opening portion under these conditions, the generator accommodating portion must be disposed even lower with respect to the outer side of the bottom portion of the cylinder main body (that is inclining toward the side opposite to the opening end of the cylinder main body) causing the pretensioner to be bulky.

However, in the present embodiment described above, since the generator accommodating portion 26 is connected to the cylinder main body 24 such that the center axis of the generator accommodating portion 26 is offset with respect to that of the cylinder main body 24 and does not intersect the center axis of the cylinder main body the, the radial direction of an opening portion 32, is inclined with respect to the radial direction of the generator accommodating portion 26. Thus, the radius of the opening portion 32 is larger than the inner diameter dimension of the generator accommodating portion 26 and as a result the area of the opening portion 32 increases. Thus, sufficient opening area can be ensured for the opening portion 32 without positioning the external periphery of the generator accommodating portion 26 even lower with respect to the outer side of the bottom portion of the cylinder main body 24. As a result the pretensioner 10 is compact overall.

Furthermore, the present embodiment is structured such that, a stopper which is provided on the gas generator 34, abuts the other end portion of generator accommodating portion 26 and thereby causes the displacement of the gas generator 34 portion to be restricted. Due to this structure, it suffices for the generator accommodating portion to have an inner diameter dimension which is equal to that of the gas generator 34 and a wall thickness which can support this inner diameter dimension.

Further, in the present embodiment, the cap 38 and the generator accommodating portion 26 are connected by the screwing together of left screws composed of a male screw and a female screw. Since the average user assumes that screws screw to the right, they are unable to take off the cap and this is an additional merit of this embodiment.

As explained above, according to the present invention, the pretensioner is compact overall.

What is claimed is:

1. A pretensioner for use with a winding shaft and webbing belt having an end, with the end anchored to the winding shaft, the pretensioner being for applying rotational force during a predetermined condition to the winding shaft, in a take-up direction for winding the webbing belt, the pretensioner comprising:

(a) a cylinder main body having an interior with a piston moveably disposed therein, wherein gas pressure in the cylinder main body causes the piston to move in a direction for supplying rotational force to the winding shaft in a take-up direction for winding the webbing belt;

(b) a generator accommodating portion disposed generally as a cylinder integrally extending from the cylinder main body, the cylinder main body having a bottom, with an opening located between the piston and the bottom of the cylinder main body, the opening being connected in fluid communication with the cylinder of the generator accommodating portions wherein the generator accommodating portion and cylinder main body each have a center axis, which are skewed relative to one another; and (c) a gas generator mountable to the generator accommodating portion for generating the gas under a predetermined condition, and supplying gas pressure for causing piston movement, wherein the generator accommodating portion includes an end, and when the gas generator is mounted to the generator accommodating portion, the gas generator includes a protruding portion having an external periphery with a stopper formed thereon, with the stopper abutting the end of the generator accommodating portion.

2. The pretensioner of claim 1, wherein the generator accommodating portion and cylinder main body each include an axis, the axis of the generator accommodating portion being oriented at an inclination relative to a direction orthogonal to the axis of the cylinder main body towards the cylinder main body.

3. The pretensioner of claim 1, wherein the stopper includes an outer diameter dimension, and the generator accommodating portion includes outer and inner diameter dimensions, with the stopper outer diameter dimension being less than the outer dimension of the generator accommodating portion, and greater than the inner diameter dimension of the generator accommodating portion.

4. The pretensioner of claim 1, further comprising a rack and pinion meshed with one another, with the pinion coupled to the winding shaft and the rack extending from the piston, wherein the rack moves with the piston, thereby rotating the pinion and applying rotational force to the winding shaft in the take-up direction for winding the webbing belt.

5. The pretensioner of claim 1, wherein the cylinder main body has an opening end side with a thickness less than a thickness of the bottom of the cylinder main body.

6. A pretensioner for use with a winding shaft and a webbing belt having an end, with the end anchored to the winding shaft, the pretensioner being for applying rotational force during a predetermined condition to the winding shaft, in a take-up direction for winding the webbing belt, the pretensioner comprising:

(a) a cylinder main body having an interior with a piston movably disposed therein, wherein gas pressure in the cylinder causes the piston to move in a direction for supplying rotational force to the winding shaft in a take-up direction for winding the webbing belt;

(b) a generator accommodating portion formed generally as a cylinder extending from the cylinder main body, the generator accommodating portion and cylinder main body each having a center axis which are skewed with respect to one another, the cylinder main body being inclined towards the generator accommodating portion, the cylinder main body having a bottom, with an opening located between the piston and the bottom of the cylinder main body, the opening being connected in fluid communication with the cylinder of the generator accommodating portion; and (c) a gas generator mountable to said generator accommodating portion for generating gas under a predetermined condition, and supplying gas pressure for causing piston movement.

7. The pretensioner of claim 6, wherein the generator accommodating portion includes an end, and when the gas generator is mounted to the generator accommodating portion, the gas generator includes a protruding portion having an external periphery with a stopper formed thereon, with the stopper abutting the end of the generator accommodating portion.

8. The pretensioner of claim 7, wherein the stopper includes an outer diameter dimension, and the generator accommodating portion includes outer and inner diameter dimensions, with the stopper outer diameter dimension being less than the outer dimension of the generator accommodating portion, and greater than the inner diameter dimension of the generator accommodating portion.

9. The pretensioner of claim 6, wherein the opening connecting the cylinder main body and the generator accommodating portion is disposed in an opening radial direction, the opening radial direction of the opening being inclined relative to the cylinder radial direction of the generator accommodating portion.

10. The pretensioner of claim 6, further comprising a rack and pinion meshed with one another, with the pinion coupled to the winding shaft and the rack extending from the piston, wherein the rack moves with the piston, thereby rotating the pinion and applying rotational force to the winding shaft in the take-up direction for winding the webbing belt.

11. The pretensioner of claim 6, wherein the cylinder main body has an opening end side with a thickness less than a thickness of the bottom of the cylinder main body.

12. A pretensioner for use with a winding shaft and a webbing belt having an end, with the end anchored to the winding shaft, the pretensioner being for applying rotational force during a predetermined condition to the winding shaft, in a take-up direction for winding the webbing belt, the pretensioner comprising:

(a) a cylinder main body having an interior with a piston movably disposed therein, wherein gas pressure in the cylinder causes the piston to move in a direction for supplying rotational force to the winding shaft in a take-up direction for winding the webbing belt;

(b) a generator accommodating portion formed generally as a cylinder extending from the cylinder main body, the generator accommodating portion and cylinder main body each having a center axis which are skewed and inclined relative to one another, the cylinder main body having a bottom, with an opening located between the piston and the bottom of the cylinder main body, the opening being connected in fluid communication with the cylinder of the generator accommodating portion;

(c) a gas generator having opposite ends, one end being mountable to said generator accommodating portion for generating gas under a predetermined condition, and supplying gas pressure for causing piston movement; and (d) a cap attachable to the other end of the gas generator, wherein when the one end of the gas generator is mounted to the generator accommodating portion, the gas generator includes a portion fitting inside said generator accommodating portion, and a protruding portion protruding from the generator accommodating portion, the protruding portion having an external periphery which forms a stopper abutting the generator accommodating portion.

13. The pretensioner of claim 12, wherein the cap is formed generally as a cylinder having a bottom and an opening end side, the opening end side including a threaded internal periphery, said other end of the generator accommodating portion having a threaded external periphery, for screwable attachment of the cap.

14. The pretensioner of claim 12, wherein the generator accommodating portion and the cylinder main body are inclined towards one another.

15. The pretensioner of claim 12, wherein the generator accommodating portion and cylinder main body each have a center axis, which are skewed relative to one another.

16. The pretensioner of claim 15, wherein the opening connecting the cylinder main body and the generator accommodating portion is disposed in an opening radial direction, the opening radial direction of the opening being inclined relative to the radial direction of the cylindrical generator receiving portion.

17. The pretensioner of claim 12, further comprising a rack and pinion meshing with one another, with the pinion connected to the winding shaft and the rack being movable with the piston, wherein piston movement causes the rack to move and thereby rotate the pinion for applying rotational force to the winding shaft in the take-up direction for winding the webbing belt.

18. The pretensioner of claim 12, wherein the stopper includes an outer diameter dimension, and the generator accommodating portion includes outer and inner diameter dimensions, with the stopper outer diameter dimension being less than the outer dimension of the generator accommodating portion, and greater than the inner diameter dimension of the generator accommodating portion.

19. A pretensioner for use with a winding shaft and a webbing belt having an end, with the end anchored to the winding shaft, the pretensioner being for applying rotational force during a predetermined condition to the winding shaft, in a take-up direction for winding the webbing belt, the pretensioner comprising:

(a) a cylinder main body having an interior with a piston movably disposed therein, wherein gas pressure in the cylinder main body causes the piston to move in a direction for supplying rotational force to the winding shaft in a take-up direction for winding the webbing belt;

(b) a generator accommodating portion disposed generally as a cylinder integrally extending from the cylinder main body, the cylinder main body having a bottom, with an opening located between the piston and the bottom of the cylinder main body, the opening being connected in fluid communication with the cylinder of the generator accommodating portion; and (c) a gas generator mountable to said generator accommodating portion for generating gas under a predetermined condition, and supplying gas pressure for causing piston movement, wherein the generator accommodating portion and cylinder main body each have a center axis, which are skewed relative to one another.

20. The pretensioner of claim 19, wherein the opening connecting the cylinder main body and the generator accommodating portion is disposed in an opening radial direction, the opening radial direction of the opening being inclined relative to the cylinder radial direction of the generator accommodating portion.

* * * * *